United States Patent Office 3,076,833
Patented Feb. 5, 1963

3,076,833
CHROMIC CHLORIDE COMPLEXES
Kirman Taylor, Painesville, and Clyde E. Milstead, Jr., North Madison, Ohio, assignors to Diamond Alkali Company, Cleveland, Ohio, a corporation of Delaware
No Drawing. Filed July 20, 1959, Ser. No. 828,009
3 Claims. (Cl. 260—438)

This invention relates to novel complexes characterized by the generic formula, CrCl.XR, wherein R is selected from the group consisting of ketones, aldehydes, alcohols, acid-esters, amino acid-esters, amides and amines, and X is a number from 1 to 4.

More particularly, the present invention relates to a method for preparing coordinated organic complexes of anhydrous chromic chloride and to the novel complexes formed by this method.

In many industrial processes involving chromium, such as in the chrome tanning of leather and chromium plating, it is generally desirable and often necessary that the amount of trivalent chromium available for the process be closely regulated. In many instances, particularly those processes involving organic solvents, this regulation has been difficult to achieve. Additionally, inasmuch as these processes require trivalent chromium, compounds of which are not generally soluble in the solvents commonly used, it has been necessary to use the more soluble hexavalent chromium compounds and then reduce these compounds to the desired trivalent chromium. Where such reductions have been carried out in the presence of the organic solvents, difficulties have been encountered.

For some time, it has been believed that anhydrous chromic chloride, although generally insoluble in water and the common organic solvents, might be solubilized in some manner and hence be a desirable source of trivalent chromium for industrial use. However, up to the present time, the supply of anhydrous chromic chloride has been somewhat limited and its cost has been prohibitive for use on a commercial scale. Recent technological advances have resulted in improved techniques of producing chromic chloride so that the cost of this material has been reduced to a point where its use in industrial processes is now economically feasible. In spite of this, however, the problem still remains as to how the anhydrous chromic chloride can be solubilized so that it may be advantageously used as a source of trivalent chromium in processes such as the organic solvent chrome tanning of leather and chromium plating. Up to the present time no satisfactory solution has been found for this problem.

It is, therefore, an object of the present invention to provide new and novel coordinated complexes of anhydrous chromic chloride, which complexes are as much as 3,000 times as soluble in common organic solvents as is the anhydrous chromic chloride itself.

Another object of the present invention is to provide a simple and economical method for producing these new and novel coordinated complexes of anhydrous chromic chloride.

These and other objects will become apparent to those skilled in the art from the description of the invention which follows.

The method of the present invention envisions preparing a novel complex of the formula, CrCl$_3$.XR, wherein R is selected from the group consisting of ketones, aldehydes, alcohols, acid-esters, amino acid-esters, amides and amines, and X is a number from 1 to 4, by heating a mixture of anhydrous chromic chloride and the organic compound selected from the group as designated hereinbefore, in the presence of a small amount of a reducing agent. More specifically, and in particular when the organic compound being complexed with the anhydrous chromic chloride has a high vapor pressure and hence is very volatile, the mixture of anhydrous chromic chloride and the organic compound is refluxed in the presence of a small amount of the reducing agent, which reducing agent serves as a catalyst. In this manner, excessive loss of the organic compound, because of its volatility is prevented. Additionally, if the organic compound is a solid at room temperature, it may be put into a solvent which will not form a complex, such as benzene, and the chromic chloride, as such or as a less stable organic coordinated complex, is added and heated so as to form the desired complex. In this manner, it is possible to form complexes using moderate temperatures which would ordinarily require sufficiently high temperatures to melt the organic compound.

It is to be noted that although the complexes of the present invention have been indicated as having the formula, CrCl$_3$.XR, this formula is merely indicative of the constituents of these complexes and should not be taken as limiting the molecular configuration thereof, since at the present time, the precise molecular arrangement of these complexes is not known. In this regard, it is realized that from the theory of electrons and other similar considerations, the complexes of the present invention could conceivably have any or all of the following configurations: (CrCl$_3$R$_x$), (CrCl$_2$R$_x$)Cl, (CrClR$_x$)Cl$_2$, (CrR$_x$)Cl$_3$. Inasmuch as the exact molecular arrangement of the novel complexes of the present invention is not presently known, no further attempt will be made to define this arrangement with more particularity, nor is any more precise description of the molecular arrangement of these complexes deemed to be necessary for a full and accurate understanding of the present invention.

It has been found in the practice of the present invention that the common reducing agents are effective in catalyzing the formation of the coordinated complexes with anhydrous chromic chloride. Examples of such reducing agents are hydrogen, sodium sulfite, stannous chloride, ferrous chloride, sodium amalgam, sulphur dioxide, chromous chloride and the various reducing metals such as aluminum, manganese, chromium and zinc. Generally, for ease in handling and separation from the product, the metallic reducing agents are preferred. Of these excellent results have been obtained with zinc, either in the form of zinc strips or pellets or as finely-divided zinc dust and for this reason, the reducing agent preferred in the present method is zinc.

As set forth above, in the practice of the present method, anhydrous chromic chloride is complexed with an organic compound selected from the group consisting of ketones, aldehydes, alcohols, acid-esters, amino acid-esters, amides and amines. Specific compounds falling within the above broad, general classes are acetone, isopropyl alcohol, dimethyl formamide, ethyl acetate, ethyl carbamate and pyridine. Exemplary of the coordinated complexes of anhydrous chromic chloride which can be formed from these compounds are the following: trichlorotriacetone chromium (III) [Cr(C$_3$H$_6$O)$_3$(Cl$_3$)]; trichlorotris(propanol-2) chromium (III) [Cr(C$_3$H$_8$O)$_3$(Cl)$_3$]; tris(N,N-dimethylformamide) chromium (III) chloride [Cr(C$_3$H$_7$ON)$_3$]Cl$_3$; trichlorodiethylacetate chromium (III) [Cr(C$_4$H$_8$O$_2$)$_2$(Cl)$_3$]; trichlorotripyridine chromium (III) [Cr(C$_5$H$_5$N)$_3$(Cl)$_3$]; trichloromonoacetone chromium (III) [Cr(C$_3$H$_6$O)Cl$_3$]; dichlorotetrakis(propanol-2) chromium (III) chloride [Cr(C$_3$H$_8$O)$_4$Cl$_2$]Cl; and trichlorotriethylcarbamate chromium (III) [Cr(C$_3$H$_7$O$_2$N)$_3$(Cl)$_3$]. It is recognized that compounds other than those specifically enumerated above may also be used in forming the subject coordinated complexes, and these compounds, it is believed, will be readily apparent to those skilled in the art.

In preparing the coordinated complexes of the present invention, a mixture of anhydrous chromic chloride and an organic compound selected from the group as designated hereinbefore, is refluxed in the presence of a small amount of a reducing agent catalyst, such as finely-divided metallic zinc. The organic compound and the anhydrous chromic chloride are present in the reaction mixture in a ratio of from about 10 to about 4 mols of organic to 1 mole of chromic chloride, while the amount of reducing agent catalyst required in the reaction is extremely small, generally about one part of the reducing agent to 500 to 1,000 parts of anhydrous chromic chloride being sufficient. It has further been found in the practice of the present process, that it is possible to vary the number of molecules of the organic material which are complexed with the anhydrous chromic chloride by varying the conditions of crystallization and recovery of the complexes. Thus, if after the formation of this desired coordinated complex it is redissolved in the organic material and heated for a period of time sufficient to dissolve all the crystals and then heated under vacuum to evaporate about one-half of the solvent, the complex which crystallizes out of the solution will have four molecules of the organic compound complexed with the anhydrous chromic chloride. Alternatively, if after the original crystalline complex has been recovered it is heated in a vacuum to remove all the solvent therefrom, one or more molecules of the organic compound are likewise removed so as to form a complex having only one or two organic molecules complexed with the anhydrous chromic chloride. These complexes, containing less than three organic molecules, are found to be much more reactive than the corresponding complexes containing three organic molecules. This increased reactivity is shown by the fact that when these compounds are placed in water they effervesce, a phenomenon not observed when the corresponding complex containing three organic molecules is placed in water.

In the practice of the present invention, the mixture of anhydrous chromic chloride and the organic compound are refluxed in the presence of a reducing agent catalyst, such as finely-divided metallic zinc, until no further reaction takes place. The length of reflux time required has been found generally to be about one hour. After the reaction has ceased, the mixture is allowed to stand for several hours, preferably as much as about 24 hours, at room temperature, i.e., 20° to 25° C., so as to effect crystallization of the coordinated complexes from the solution. The crystalline coordinated complexes are then separated from the liquid portion of the reaction mixture by filtration or centrifuging. When separated and dried, these complexes are seen to be highly colored, ranging from green and brown to violet and pink.

In order that those skilled in the art may better understand the method of the present invention and the manner in which it may be practiced, the following specific examples are given.

*Example I*

50 gms. of anhydrous chromic chloride are refluxed in 100 gms. of acetone, containing 0.1 gm. of zinc for a period of one hour. At the expiration of this time, the reaction mixture is allowed to stand at 22° C. for a period of 30 hours following which time it is filtered to recover a mass of violet crystals. The chrominum and chlorine analysis of these crystals is as follows:

| | Percent |
|---|---|
| Theoretical chromium | 15.6 |
| Actual chromium | 15.6 |
| Theoretical chlorine | 32.0 |
| Actual chlorine | 32.6 |

This analysis indicates the formation of the desired $CrCl_3.3C_3H_6O$ complex.

*Example II*

50 gms. of anhydrous chromic chloride are refluxed in 100 gms. of isopropyl alcohol containing 0.1 gm. of finely-divided zinc for a period of about one hour. Following this time the reaction mixture is allowed to stand at 22° C. for 24 hours and is then filtered to recover a mass of violet-pink crystals. The chrominum and chlorine analysis of these crystals are as follows:

| | Percent |
|---|---|
| Theoretical chromium | 15.3 |
| Actual chromium | 15.3 |
| Theoretical chlorine | 31.4 |
| Actual chlorine | 32.2 |

This analysis indicates the formation of the desired $CrCl_3.3C_3H_8O$ complex.

*Example III*

50 gms. of anhydrous chromic chloride are refluxed for a period of one hour in 100 gms. of dimethyl formamide containing 0.1 gm. of zinc. At the end of this time the reaction mixture is allowed to stand at 22° C. for 26 hours. The reaction mixture is then filtered to recover a mass of violet-pink crystals. The chromic and chlorine analysis of these crystals is as follows:

| | Percent |
|---|---|
| Theoretical chromium | 13.8 |
| Actual chromium | 13.6 |
| Theoretical chlorine | 28.2 |
| Actual chlorine | 28.5 |

This analysis indicates the formation of the desired $CrCl_3.3C_3H_7ON$ complex.

*Example IV*

160 gms. of anhydrous chromic chloride are refluxed for about 30 minutes in 946 ml. of pyridine containing 5 zinc strips. At the end of this time, the reaction mixture is cooled at about 22° C. and held at this temperature until the complex has completely crystallized out of the solution. The solution is then filtered and about 306 gms. of green crystals are recovered, which crystals are dried at 85° C. for about three hours. The chromium and chlorine analysis of these crystals is as follows:

| | Percent |
|---|---|
| Theoretical chromium | 31.1 |
| Actual chromium | 31.1 |
| Theoretical chlorine | 26.9 |
| Actual chlorine | 26.9 |

This analysis indicates the formation of the desired $CrCl_3.3C_5H_5N$ complex.

*Example V*

120 gms. of anhydrous chromic chloride are refluxed for a period of about 24 hours in a Soxhlet extractor with 1,000 ml. of ethyl acetate containing 2 zinc strips and .1 gm. of powdered zinc. After this time, the flask is cooled and the crystals filtered off. 191 gms. of the crystals are recovered. The chromium and chlorine analysis of the crystals is as follows:

| | Percent |
|---|---|
| Theoretical chromium | 15.5 |
| Actual chromium | 15.8 |
| Theoretical chlorine | 31.8 |
| Actual chlorine | 31.8 |

This analysis indicates the formation of the desired $CrCl_3.2C_4H_8O_2$ complex.

*Example VI*

A coordinated complex with acetone is prepared as in Example I. The crystals which are recovered from the reaction mixture are then dried under vacuum until no further color change takes place in the crystals. An analysis of the crystals reveals that two of the acetone molecules have been removed from the complex, giving a complex having the following emperical formula:

$$CrCl_3.C_3H_6O$$

Example VII

A coordinated complex with isopropyl alcohol is prepared as in Example II. The recovered crystals are redissolved by refluxing in isopropyl alcohol, and the resulting solution is evaporated under vacuum to about one-half of its original volume. After standing for about eight hours, crystals come out of the solution and are removed therefrom by filtration. The analysis of these crystals indicates that an additional molecule of isopropyl alcohol has been added giving a complex having the empirical formula: $CrCl_3 \cdot 4C_3H_8$.

Example VIII 50 gm. of ethyl carbamate are dissolved in about 200 ml. benzene and added to 50 gm. of the complex of Example I. The reaction mixture is heated to boiling for a period of time sufficient to distill off the acetone. Following this time, the reaction mixture is allowed to stand at 22° C. for about 4 hours and is then filtered to recover a mass of crystals. The chrominum and chlorine analysis of these crystals indicates the formation of the desired $CrCl_3 \cdot 3C_3H_7O_2N$ complex.

Example IX

The solubilities of the product of Example II and $CrCl_3$ in isopropyl alcohol are determined by agitating each in 100 gms. of the isopropyl alcohol at a temperature of 24° C. The resultant solubility is expressed in gms. of $CrCl_3$ per 100 gms. of isopropyl alcohol. The results obtained are as follows:

| | |
|---|---|
| $CrCl_3$ | 0.0138 |
| Product of Example II | 1.85 |

Similar determinations are made with the products of the other examples with solubility increases of as much as 3,000 times being obtained with the complexes of the present invention as compared to $CrCl_3$ itself.

The complexes of the present invention have been found to be useful not only in organic tanning and plating operations wherein a source of trivalent chromium is required, but also these complexes are useful as intermediates in forming various organic compounds of chromium.

While there have been described various embodiments of the invention, the methods and products described are not intended to be understood as limiting the scope of the invention as it is realized that changes therewithin are possible, and it is further intended that each and every element recited in any of the following claims is to be understood as referring to all equivalent elements for accomplishing substantially the same results in substantially the same or equivalent manner, it being intended to cover the invention broadly in whatever form its principle may be utilized.

What is claimed is:
1. A method of preparing

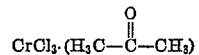

which comprises drying crystals of

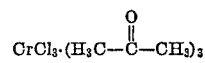

under vacuum until substantially no further color change occurs in said crystals and recovering the thus-formed complex,

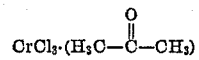

2. A complex of the formula:

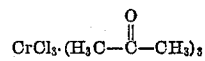

3. A complex of the formula:

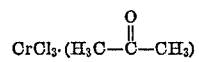

References Cited in the file of this patent

UNITED STATES PATENTS

| | | |
|---|---|---|
| 1,228,622 | Voetter | June 5, 1917 |
| 2,228,039 | Van Peski | Jan. 7, 1941 |
| 2,294,525 | Waugh | Sept. 1, 1942 |
| 2,428,356 | Chester et al. | Oct. 7, 1947 |

FOREIGN PATENTS

| | | |
|---|---|---|
| 716,834 | Great Britain | Nov. 21, 1956 |

OTHER REFERENCES

Kandelaki: Chemical Abstracts, vol. 32, p. 6227 (1938).

Hein: J. Prakt. Chem., vol. 153, pp. 160–168 (1939).

Thiessen et al.: Z. Anorg. Allegem, Chem., vol. 181, pp. 285–94 (1929).

Pfeiffer: Beilstein's Handbuch, 4th ed., vol. 20, pp. 198 (1935).

UNITED STATES PATENT OFFICE
CERTIFICATE OF CORRECTION

Patent No. 3,076,833                      February 5, 1963

Kirman Taylor et al.

It is hereby certified that error appears in the above numbered patent requiring correction and that the said Letters Patent should read as corrected below.

Column 1, line 10, for "$CrCl.XR$," read -- $CrCl_3.XR$, --; line 14, after "particularly" strike out the period and insert a comma; column 5, line 11, for "$CrCl_3.4C_3H_8$." read -- $CrCl_3.4C_3H_8O$. --.

Signed and sealed this 10th day of September 1963.

(SEAL)
Attest:

ERNEST W. SWIDER                         DAVID L. LADD
Attesting Officer                            Commissioner of Patents